US008560120B2

(12) United States Patent
Kim

(10) Patent No.: US 8,560,120 B2
(45) Date of Patent: Oct. 15, 2013

(54) MOVING ROBOT AND OPERATING METHOD THEREOF

(75) Inventor: Sang Yun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 776 days.

(21) Appl. No.: 12/440,063

(22) PCT Filed: Sep. 6, 2007

(86) PCT No.: PCT/KR2007/004316
§ 371 (c)(1),
(2), (4) Date: Jun. 2, 2010

(87) PCT Pub. No.: WO2008/030054
PCT Pub. Date: Mar. 13, 2008

(65) Prior Publication Data
US 2010/0234998 A1    Sep. 16, 2010

(30) Foreign Application Priority Data
Sep. 6, 2006  (KR) .......................... 10-2006-0085677

(51) Int. Cl.
G05B 15/00 (2006.01)
G05B 19/18 (2006.01)

(52) U.S. Cl.
USPC ........... 700/259; 700/151; 700/245; 700/255; 700/258; 700/260; 700/261; 700/262

(58) Field of Classification Search
USPC .......... 701/23, 26, 79, 96, 301; 700/151, 258, 700/259, 245, 255, 260, 261, 262
See application file for complete search history.

(56) References Cited

U.S. PATENT DOCUMENTS

| 5,280,622 A * | 1/1994 | Tino ............................. 700/255 |
| 5,867,800 A * | 2/1999 | Leif ............................... 701/23 |
| 7,539,558 B2 * | 5/2009 | Adachi et al. ................. 700/245 |
| 7,778,732 B2 * | 8/2010 | Adachi et al. ................. 700/245 |
| 2003/0025472 A1 * | 2/2003 | Jones et al. .............. 318/568.12 |
| 2004/0193323 A1 * | 9/2004 | Higaki et al. ................. 700/259 |
| 2005/0171644 A1 * | 8/2005 | Tani ............................. 700/253 |
| 2006/0271238 A1 * | 11/2006 | Choi et al. ................... 700/245 |

(Continued)

FOREIGN PATENT DOCUMENTS

| JP | 2005-304540 | 11/2005 |
| JP | 2006-218005 | 8/2006 |
| KR | 10-1999-0008523 | 2/1999 |

OTHER PUBLICATIONS

International Search Report dated Dec. 12, 2007.

*Primary Examiner* — Khoi Tran
*Assistant Examiner* — Jorge Peche
(74) *Attorney, Agent, or Firm* — KED & Associates LLP

(57) ABSTRACT

A moving robot and its operation method are disclosed. The moving robot includes a moving body/object sensing unit that senses a movement of a human body within a certain distance, a traveling unit that controls a traveling speed and direction, and a controller that outputs a control signal for controlling the traveling speed according to pre-set data to the traveling unit. In a state that the moving robot performs a cleaning operation while moving its locations, when a movement of a human body is sensed by the moving body/object sensing unit, the traveling speed is reduced to allow the user to easily control the external operation, and the efficiency can be increased by utilizing the moving body/object sensing unit for operations of different modes.

4 Claims, 6 Drawing Sheets

(56) References Cited

U.S. PATENT DOCUMENTS

| | | | |
|---|---|---|---|
| 2007/0039293 A1* | 2/2007 | Baek et al. | 55/354 |
| 2008/0007193 A1* | 1/2008 | Jones et al. | 318/568.12 |
| 2008/0009969 A1* | 1/2008 | Bruemmer et al. | 700/245 |
| 2008/0009970 A1* | 1/2008 | Bruemmer | 700/245 |
| 2009/0055019 A1* | 2/2009 | Stiehl et al. | 700/249 |
| 2009/0234499 A1* | 9/2009 | Nielsen et al. | 700/250 |

* cited by examiner

MOVING ROBOT AND OPERATING METHOD THEREOF

TECHNICAL FIELD

The present invention relates to a moving robot and its operation method and, more particularly, to a moving robot and its operation method capable of controlling an operation of a moving robot when a movement of an object is detected within a certain distance.

BACKGROUND ART

In general, the moving robot is configured to be able to perform cleaning while automatically moving by rotating its movable wheels according to driving of a motor and performing sucking, without a manual operation by the user. In this case, the moving robot is provided with an obstacle sensor, so that when an obstacle is sensed, the moving robot converts its traveling direction and traveling speed in performing the cleaning operation.

However, because the related art moving robot performs the cleaning operation while on the move, when the user wants to input a control command by using a remote controller or the like, the moving robot can hardly detect the control command, causing a problem that an external manipulation through the remote controller is not easy.

In addition, when the user wants to input the control command by directly manipulating a key button of a main body of the moving robot, it is not easy to manipulate the key button because the moving robot is on the move.

DISCLOSURE OF INVENTION

Technical Problem

Thus, an object of the present invention is to provide a moving robot and its operation method capable of controlling an operation of the moving robot when a movement of an object located near or around the moving robot is detected, such that a traveling speed of the moving robot is controlled according to an operation mode or a certain designated operation is performed.

Technical Solution

To achieve the above object, there is provided a moving robot including: a traveling unit that controls a traveling speed and direction by controlling driving of a motor connected with movable wheels; a dust suction unit that sucks dust along with air according to a rotational operation of a fan motor that generates a suction force; an obstacle sensor that senses an obstacle within a certain distance; an output unit that outputs input data and operation state data; a moving body/object sensing unit that senses a movement of a human body or an object located within a certain distance; and a controller that outputs a control signal to be used for controlling an operation, wherein when a movement of a certain object is sensed by the moving body/object sensing unit while the moving robot is traveling, the controller outputs a control signal to control the traveling speed according to pre-set data to the traveling unit.

To achieve the above object, there is also provided a method for operating a moving robot. including: performing a pre-set operation while the moving robot is moving in its locations; sensing a movement of an object within a certain distance; and reducing a traveling speed.

To achieve the above object, there is also provided a method for operating a moving robot, including: setting a power saving mode; sensing a movement of an object within a certain distance; and releasing the power saving mode and changing to an input standby mode.

To achieve the above object, there is also provided a method for operating a moving robot. including: setting a security mode; sensing a movement of an object within a certain distance; and outputting a pre-set warning signal.

Advantageous Effects

According to the present invention, when a movement of a human body is sensed through a body sensing unit while the moving robot performs a cleaning operation, the traveling speed of the moving robot is reduced to thus allow the user to easily control an external operation of the moving robot, and the body sensing unit can be utilized for an operation in a different mode to thus increase its utilization.

BEST MODE FOR CARRYING OUT THE INVENTION

Embodiments of the present invention will now be described with reference to the accompanying drawings.

Figure 1:
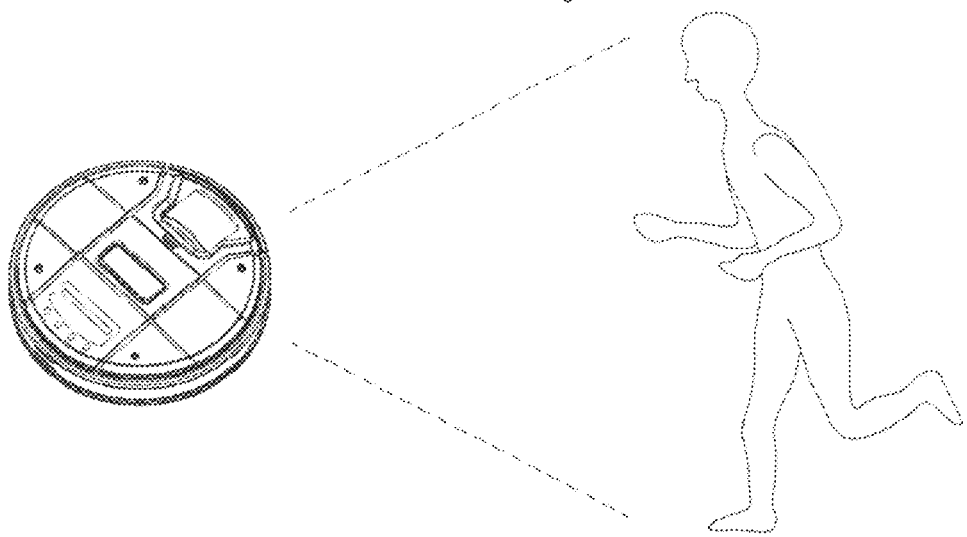
FIG. 1 is a view illustrating the configuration of a moving robot according to the present invention.

FIG. 1 is a view illustrating the configuration of a moving robot according to the present invention.

As shown in FIG. 1, when a movement of an object within a certain distance is sensed through a moving body/object sensing unit while the moving robot according to the present invention is moving, a traveling speed of the moving robot is controlled. For example, when the movement of the object is sensed, the moving robot recognizes that the user approaches to input a control command, so it reduces its traveling speed to allow the user to easily input the control command.

Figure 2:
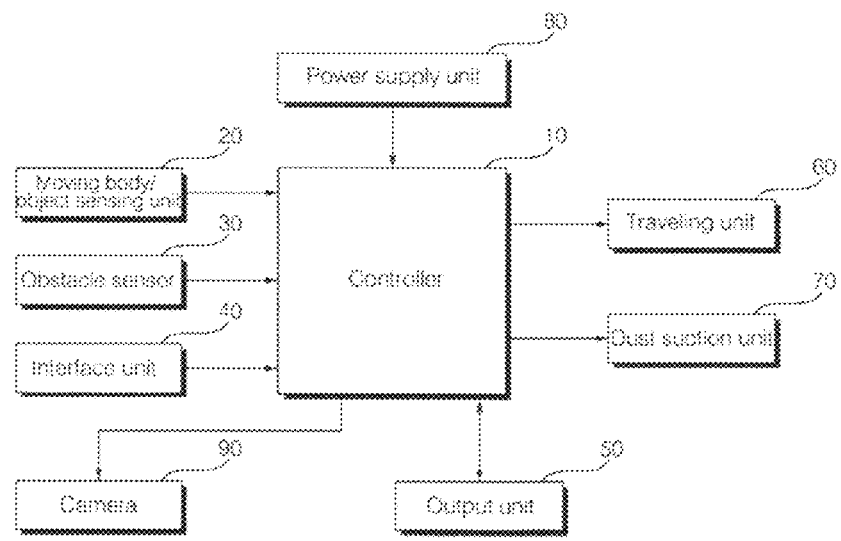
FIG. 2 is a schematic block diagram showing the configuration of the moving robot according to the present invention.

The moving robot will now be described in detail with reference to FIG. 2.

Here, the moving object/body sensing unit 20 includes a moving object/body sensor which senses a movement of an object assuming a certain infrared ray. In the present invention, as the moving body/object sensor, a pyroelectric infrared (PIR) sensor will be taken as an example in the following description. Besides the PIR sensor, any sensor can be used as the moving body/object sensor so long as it is able to sense a movement of an object having a certain temperature or sense a human body.

The PIR sensor subtly senses a small amount of infrared ray generated from the human body, and so on, by using a pyroelectric effect, namely, a phenomenon that when ferroelectrics receives an infrared ray, it absorbs thermal energy of the infrared ray, causing a change in its spontaneous polarization, and electric charges are induced in proportion to the variation. The PIR sensor senses a movement according to an infrared ray radiated from a certain object such as the human body, and so on, an ambient temperature, and a wavelength, etc. Because the PIR sensor can sense the infrared ray radiated from the human body having the body temperature of 36.5° C., it can sense a movement of a person. In this case, there may be much difference in the amount of radiated infrared rays according to each person, when a movement of each person is actually sensed through the moving body/object sensor, so the measured value is within the range of about 9.4~10.4.

The PIR sensor senses a temperature difference of 3° C. or larger between an indoor temperature and the human body and an object that moves at a rate of 30 cm to 2 m a second. For example, when it is assumed that a person having a temperature of 34° C. enters into a room in which a room temperature is 24° C., the PIR sensor instantaneously senses the temperature difference between the indoor temperature and the person to thus sense the movement of the person.

In addition, the PIR sensor includes an optical filter that allows only a signal of a certain frequency band to pass therethrough. Thus, upon receiving only the signal of the certain frequency band, the PIR sensor can discriminately sense an object that moves. In this case, the PIR sensor may also sense a movement of a pet such as a dog or a cat that has a body temperature similar to that of the human body. When there are multiple PIR sensors according to circumstances, they can separately discriminate the outlines of the movement of the person and that of the animal, thereby discriminating respective movements of the person and the animal.

The moving object/body sensing unit further includes a lens unit that controls an operation sensing distance and sensitivity of the PIR sensor. The lens unit maximizes extension of a sensing distance and sensitivity of the PIR sensor, serves to prevent an influence of the external wind and blocks an external light, to thus prevent the PIR sensor from being affected by the external light.

The obstacle sensor 30 includes an impact sensor that senses an impact from an obstacle, a distance sensor that senses the distance from the obstacle by using ultrasonic waves or infrared rays, and the like. When the moving robot collides with the obstacle or when the distance from the obstacle comes within a certain distance, the obstacle sensor 30 applies an obstacle sense signal to the controller 10. The interface unit 40 senses a control signal outputted from an external source by a remote controller or the like, and applies it to the controller 10.

The output unit 50 includes a display unit 51 which has a screen using an LCD or the like and displays input data or operation state data in the format of a message, and a speaker 53 which outputs voice data.

The controller 10 drives a fan motor according to the control signal inputted through at least one of the input unit and the interface unit 40, and applies a motor drive signal to the traveling unit 60, to allow the moving robot to move according to rotation of the movable wheels to suck dust through the dust suction unit 70. In this case, when the obstacle sense signal is applied from the obstacle sensor 30, the controller 10 controls the operation of the traveling unit 60 to change a traveling direction.

While the moving robot is set in a cleaning mode and moves, when a movement of a certain object is sensed by the moving object/body sensing unit 20, the controller 10 outputs a control signal to the traveling unit 60, to thus control the operation of the moving robot. In particular, when a movement of a human body is sensed by the moving object/body sensing unit 20, the controller 10 recognizes that the user approaches to input a control command by manipulating the input unit, so it applies a motor drive signal to the traveling unit 60 in order to reduce the traveling speed to a pre-set speed.

When a control command is inputted by the user within a certain time, the controller 10 controls the operation of the moving robot according to the inputted control command. When a control command is not inputted from the exterior during the certain time after the traveling speed is reduced, the controller recognizes that the user does not input a control command, so it applies a motor drive signal to the traveling unit 60 to recover the traveling speed to the previous speed and re-perform the previous operation before the movement of the human body is sensed.

In addition, when a control command is not inputted after a certain operation is completed or from the exterior, the controller 10 controls the moving robot to be operated in a power saving mode. When a movement of a certain object is sensed through the moving object/body sensing unit 20 while the moving robot is being operated in the power saving mode, the controller 10 recognizes that the user approaches to input a control command and releases the power saving mode so as to be changed to an input standby mode state. However, when a control command is not inputted from the external source during a certain time period even after the moving robot is changed to the input standby mode state, the controller 10 controls the moving robot to be operated in the power saving mode. That is, when the user simply passes by the moving robot, the controller 10 recognizes that the user does not input a control command or recognizes that a movement of a pet has been sensed, and re-performs the previous operation.

In addition, when a movement of a certain object is sensed through the moving object/body sensing unit 20 while the moving robot is operated in a security mode according to a setting, the controller 10 outputs a certain warning signal. In this case, the controller 10 recognizes sensing of a movement of an object in the security mode as that an intruder approaches, so the controller 10 controls the output unit 50 to output the warning signal. In this case, the warning signal may be outputted in the format of at least one of a warning message and a warning sound. The controller 10 may control such that when a certain time lapses, the warning message or the warning sound is not outputted any longer according to a setting. In addition, when a command such as a stop command is not inputted although the warning message or the warning sound is outputted for more than a certain time period, the controller may control such that a signal is outputted to the exterior to allow a security device at home to sound.

In addition, when such an alarm signal is outputted, the controller 10 may operate and control the camera 90 to capture an image or video in a direction in which a movement of the human body is sensed according to the operation of the camera 90, besides the warning message or the warning sound, to thus facilitate confirmation of an intruder afterward.

Figure 3:
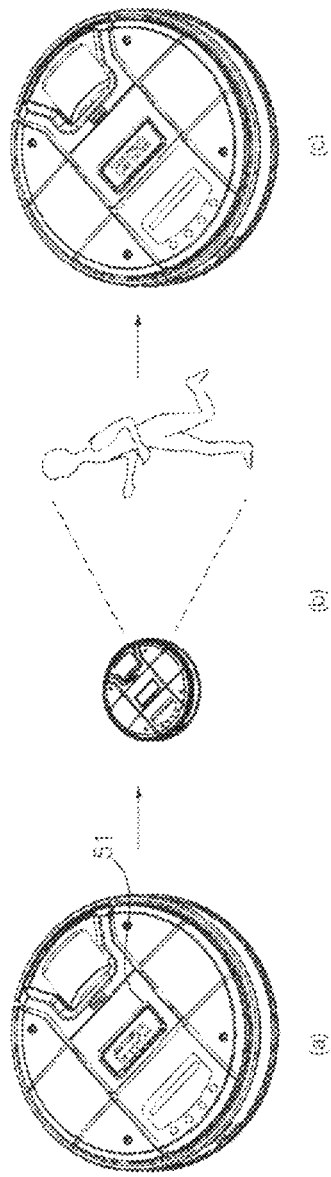
FIG. 3 is a view for explaining a method for operating a moving robot according to one embodiment of the present invention.

FIG. 3 is a view for explaining a method for operating a moving robot according to one embodiment of the present invention.

With reference to FIG. 3, FIG. 3a shows an example that the moving robot is operated in an automatic traveling mode, and in this case, its operation mode and traveling speed (3 km/h) are displayed on the display unit 51. When a movement of a human body is sensed within a certain distance through the moving object/body sensing unit 20 as shown in FIG. 3(*b*) while the moving robot is being operated in the automatic traveling mode, as shown in FIG. 3(*c*), the controller 10 outputs a message informing that the moving body has been sensed in response to a sense signal of the moving object/body sensing unit 20, and outputs a motor drive signal to the traveling unit 60, to thus reduce the traveling speed from '3 km/h' to '1 km/h'. Likewise, the operation mode and the traveling speed (1 km/h) are displayed on the display unit 51. Accordingly, when the user approaches the moving robot, because the traveling speed of the moving robot is changed, the user can easily input a control command.

Figure 4:
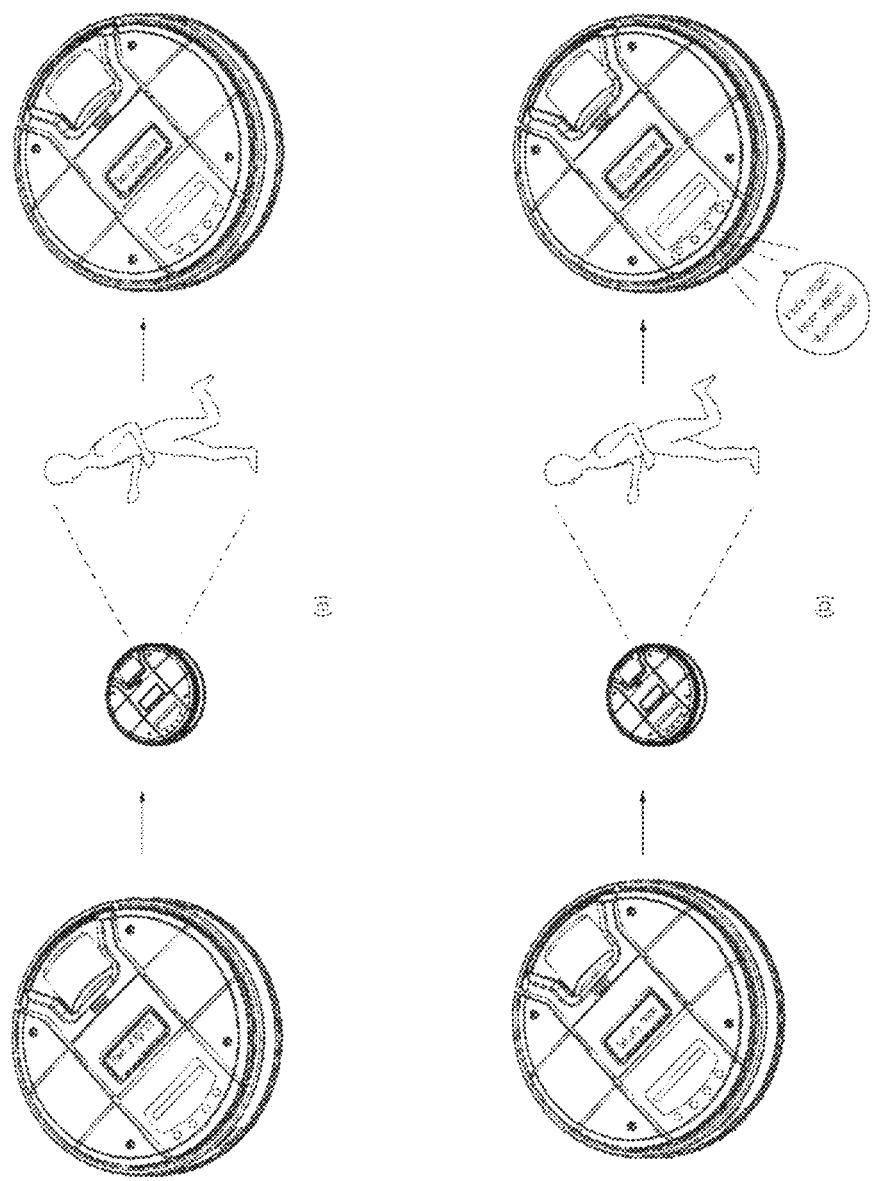
FIG. 4 is a view for explaining a method for operating a moving robot according to another embodiment of the present invention.

FIG. 4 is a view for explaining a method for operating a moving robot according to another embodiment of the present invention. FIG. 4(*a*) is a view showing an example of a case where a movement of the human body is sensed when the moving robot is being operated in the power saving mode, and FIG. 4(*b*) is a view showing an example of a case where the human body is sensed when the moving robot is being operated in the security mode.

First, with reference to FIG. 4(*a*), when an operation being performed is completed or when a control command is not inputted by the user during more than a certain time period, the moving robot is operated in the power saving mode to reduce power consumption, and at this time, a message informing about the operation in the 'power saving mode' is displayed on the display unit 51. If a movement of the human body is sensed within a certain distance through the moving body/object sensing unit 20 in the power saving mode, the controller 10 releases the 'power saving mode' and changes the operation mode to an 'input standby mode' state, to thus previously change to the state in which a control command can be inputted by the user. Likewise, a message informing about the operation in the 'input standby mode' is displayed on the display unit 51.

Meanwhile, with reference to FIG. 4(*b*), when the user goes to bed or when the user goes out, the moving robot is operated in the security mode, and in this case, a message informing about the operation in the 'security mode' is displayed on the display unit 51. If a movement of the human body is sensed within a certain distance through the moving body/object sensing unit 20 during the operation in the security mode, the controller 10 recognizes that an intruder has approached, and controls such that a warning message such as 'intruder detected!!' is outputted through the display unit 51 or the same warning sound as the outputted warning message is outputted through the speaker 53 by more than a certain number of times.

The operation of the present invention constructed as described above will be explained as follows.

Figure 5:
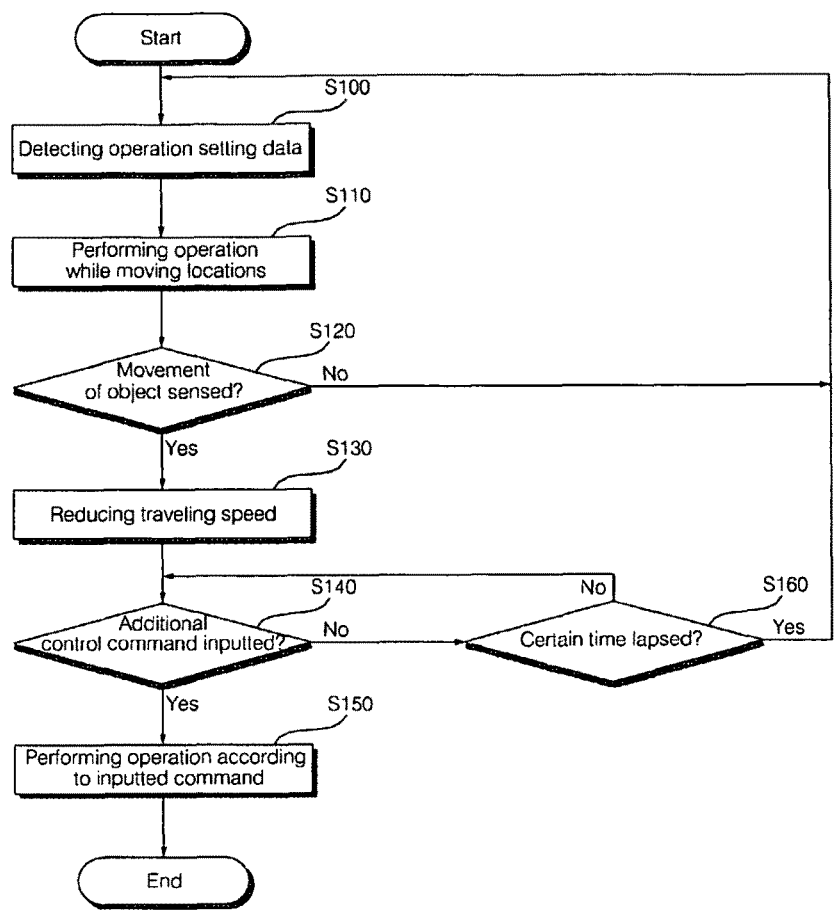
FIG. 5 is a flow chart illustrating the process of the method for operating the moving robot according to one embodiment of the present invention.

FIG. 5 is a flow chart illustrating the process of the method for operating the moving robot according to one embodiment of the present invention.

The method for operating the moving robot will now be described in detail with reference to FIG. 5. Upon detecting operation setting data inputted by the user from an external source or according to a pre-set control command (S100), the moving robot performs a cleaning operation while moving in its locations according to the operations of the traveling unit 60 and the dust suction unit 70. At this time, it is checked whether the installed obstacle sensor 30 and the moving body/object sensing unit 20 are operated in an ON state. When the obstacle sensor 30 and the moving body/object sensing unit 20 are in an OFF state, they are changed to the ON state so as to be operated.

When the moving robot performs the cleaning operation while moving in its locations, a movement of an object within a certain distance is sensed through a moving body/object sensing unit 20 (S120). When the movement of an object, for example, when the movement of a human body, is sensed within a certain distance through the moving body/object sensing unit 20, it is recognized that the user approaches to input a control command, and a signal for controlling such that a motor driving speed is reduced is outputted to the traveling unit 60, to thus reduce the traveling speed (S130). At this time, when an external control command is inputted by the user, the operation of the moving robot is performed according to the inputted control command (S140).

Meanwhile, in the state that the traveling speed is reduced upon detecting the movement of the human body by the moving body/object sensing unit 20, if a control command is not inputted by the user during a certain time period (S160), the controller 10 recognizes that the user does not input a control command, and re-detects pre-set operation data (S100) to thus re-perform a pre-set operation (S110).

Figure 6:
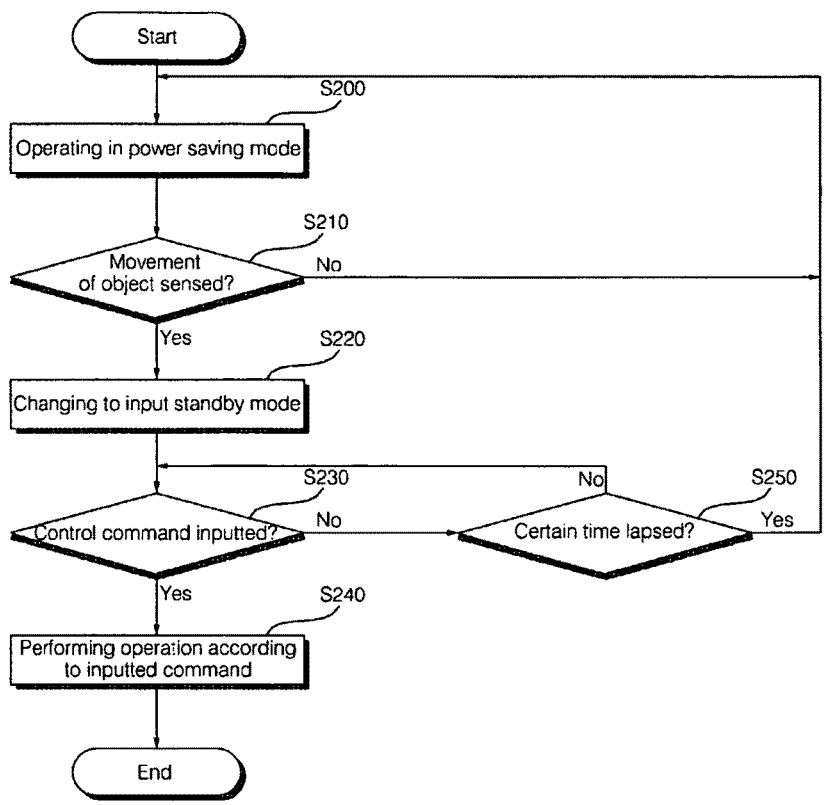
FIGS. 6 and 7 are flow charts illustrating the process of the method for operating the moving robot according to another embodiment of the present invention.
Figure 7:
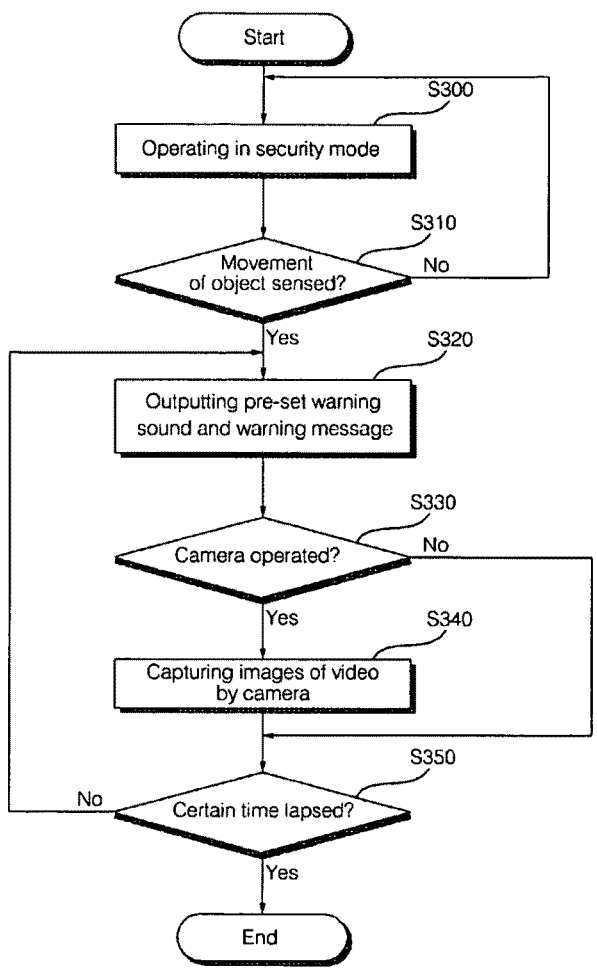

FIGS. 6 and 7 are flow charts illustrating the process of the method for operating the moving robot according to another embodiment of the present invention.

With reference to FIG. 6, when the moving robot is operated in the power saving mode (S200), if a movement of an object, for example, if a movement of a human body is sensed, within a certain distance by the moving body/object sensing unit 20 (S210), it is recognized that the user approaches to input a control command, and the power saving mode of the moving robot is released and changed to the input standby mode(S220). In this case, in the state that the moving robot is changed to the input standby mode according to the movement of the human body detected by the moving body/object sensing unit 20, when an external control command is inputted by the user within a certain time period (S230), the operation of the moving robot is performed according to the inputted control command (S240). Meanwhile, if a control command is not inputted by the user even after the certain time has lapsed (S250), the controller 10 recognizes that the user does not input a control command or recognizes malfunction, and changes the operation mode to the power saving mode state (S200).

The operation method when the moving robot is operated in the security mode according to the embodiment of the present invention will now be described with reference to FIG. 7. In the state that the moving robot is operated in the security mode (S300), when the movement of an object, for example, when the movement of the human body, is sensed within a certain distance by the moving body/object sensing unit 20, the controller 10 recognizes that an intruder has been detected and outputs a warning signal, to thus output at least one of a pre-set warning sound and a pre-set warning message (S320). In this case, the warning sound or the warning message is outputted by more than a certain time period, or outputted by more than the certain time period and then automatically stopped, according to a setting (S350). Meanwhile, the camera 90 is operated in conjunction when the warning signal is outputted according to the detection of the intruder (S330), to capture an external video to confirm the intruder afterward (S340).

The moving robot and its operation method according to the present invention have been described with reference to the accompanying drawings, but the present invention is not limited to the disclosed embodiments and drawings but can be applicable within the scope that its technical idea is protected.

Industrial Applicability

As described above, according to the moving robot and its operation method according to the present invention, when a movement of an object is sensed within a certain distance by the moving body/object sensing unit, the operation of the moving robot is changed according to the operation mode, whereby the user can easily approach the moving robot and control its operation, detection of an intruder can be possible by setting the security mode or the like, and the utilization of the moving robot can be increased.

The invention claimed is:

1. A moving robot, comprising:
a traveling device that controls a traveling speed and direction by controlling driving of a motor connected with a plurality of movable wheels;
a dust suction device that sucks dust along with air according to a rotational operation of a fan motor that generates a suction force;
an obstacle sensor that senses an obstacle within a predetermined distance;
an output device that outputs input data and operation state data;
a moving body/object sensor that senses movement of an object located within a predetermined distance; and
a controller that outputs a control signal to control an operation, wherein when a movement of a certain object is sensed by the moving body/object sensor while the moving robot is traveling, the controller outputs to the traveling device a control signal to control the traveling speed according to pre-set data, and wherein when the movement of the object is sensed by the moving body/object sensor while the moving robot is operated, the controller outputs to the traveling device a control signal to reduce the traveling speed of the moving robot, and outputs to the traveling device a control signal to recover the traveling speed of the moving robot to the previous state when a control command is not input from an external source during a predetermined time period after the traveling speed of the moving robot is reduced.

2. The moving robot of claim 1, wherein the moving body/object sensor comprises a pyroelectric infrared (PIR) sensor that senses movement of an object that radiates a predetermined amount of infrared rays.

3. The moving robot of claim 1, wherein when the movement of the object is sensed, the controller outputs to the traveling device a control signal to reduce the traveling speed of the moving robot to a pre-set speed.

4. a method for operating a moving robot, the method comprising:
controlling a traveling speed and direction by controlling driving of a motor connected with a plurality of movable wheels via a traveling device;
sucking dust along with air according to a rotational operation of a fan motor that generates a suction force via a dust suction device;
sensing an obstacle within predetermined distance via an obstacle device;
outputting input data and operation state data via an output device;
sensing movement of an object within a predetermined distance via a moving body/object sensor;
outputting a control signal to control an operation via a controller, wherein when a movement of a certain object is sensed by the moving body/object sensor while the moving robot is traveling, the controller outputs to the traveling device a control signal to control the traveling speed according to pre-set data;
outputting a control signal, via the controller, to the traveling device to reduce the traveling speed of the moving robot when the movement of the object is sensed by the moving body/object sensor while the moving robot is operated; and
outputting a control signal, via the controller to the traveling device, to recover the traveling speed of the moving robot to a previous state when a control command is not input from an external source during a predetermined time period after the traveling speed of the moving robot is reduced.

* * * * *